US007940236B2

(12) United States Patent
Miller et al.

(10) Patent No.: US 7,940,236 B2
(45) Date of Patent: May 10, 2011

(54) PASSIVE MATRIX ELECTRO-LUMINESCENT DISPLAY SYSTEM

(75) Inventors: Michael E. Miller, Honeoye Falls, NY (US); John F. Hamilton, Jr., Rochester, NY (US); Andrew D. Arnold, Hilton, NY (US)

(73) Assignee: Global OLED Technology LLC, Herndon, VA (US)

( * ) Notice: Subject to any disclaimer, the term of this patent is extended or adjusted under 35 U.S.C. 154(b) by 658 days.

(21) Appl. No.: 11/737,786

(22) Filed: Apr. 20, 2007

(65) Prior Publication Data

US 2008/0259004 A1 Oct. 23, 2008

(51) Int. Cl.
*G09G 3/30* (2006.01)
*G09G 5/10* (2006.01)
*H04N 5/70* (2006.01)

(52) U.S. Cl. ............. 345/77; 345/76; 345/690; 348/801

(58) Field of Classification Search ........................ None
See application file for complete search history.

(56) References Cited

U.S. PATENT DOCUMENTS

| | | | | |
|---|---|---|---|---|
| 4,853,592 | A | 8/1989 | Strathman | |
| 5,844,368 | A | 12/1998 | Okuda et al. | |
| 7,616,264 | B1 * | 11/2009 | Greenberg | 348/584 |
| 2002/0167474 | A1 * | 11/2002 | Everitt | 345/82 |
| 2004/0125046 | A1 | 7/2004 | Yamazaki et al. | |
| 2006/0033693 | A1 * | 2/2006 | Sako et al. | 345/87 |
| 2006/0107616 | A1 * | 5/2006 | Ratti et al. | 52/750 |
| 2007/0257866 | A1 * | 11/2007 | Cok | 345/76 |
| 2009/0160364 | A1 * | 6/2009 | Ackermann et al. | 315/294 |
| 2009/0195536 | A1 * | 8/2009 | Louise et al. | 345/419 |

FOREIGN PATENT DOCUMENTS

| | | |
|---|---|---|
| EP | 1408479 | 4/2004 |
| EP | 1457958 | 9/2004 |
| EP | 2006/035246 | 4/2006 |
| EP | 2006/035248 | 4/2006 |
| EP | 2006/067520 | 6/2006 |
| EP | 1 739 650 | 1/2007 |
| GB | 2429565 | 2/2007 |

OTHER PUBLICATIONS

Eisenbrand et al.; Multiline Addressing by Network Flow.
Soh et al.; Dependence of OLED Display Degradation on Driving Conditions.
Yang et al.; P-41 PMOLED Driver Design with Pre-charge Power Saving Algorithm; SID 06 Digest; pp. 347-350.

* cited by examiner

*Primary Examiner* — Bipin Shalwala
*Assistant Examiner* — Daniel Badell
(74) *Attorney, Agent, or Firm* — Morgan, Lewis & Bockius LLP

(57) ABSTRACT

A passive matrix, electro-luminescent display system has a passive matrix, electro-luminescent display having an orthogonally oriented array of column and row electrodes and an electro-luminescent layer located between the electrodes at the intersection of each column and row electrode forming an individual light-emitting element. Drivers provide separate signals at different times to different groups of row electrodes within the array of row electrodes; wherein the row electrodes of each group simultaneously receive at least two different level signals. A display driver receives and processes the input image signal to provide a presharpened image control signal. Column drivers respond to the presharpened image control signal for simultaneously providing a signal to the multiple column electrodes within the array of column electrodes at the same time signals are provided to the groups of row electrodes so that the concurrence of row and column signals causes individual light-emitting element to produce light.

7 Claims, 13 Drawing Sheets

PASSIVE MATRIX ELECTRO-LUMINESCENT DISPLAY SYSTEM

FIELD OF THE INVENTION

The present invention relates to a passive matrix electro-luminescent display system and ways for driving passive matrix electro-luminescent displays.

BACKGROUND OF THE INVENTION

Numerous technologies for forming flat-panel displays are known in the art. One such technology is the electro-luminescent display, which is formed by coating a thin layer of electro-luminescent material between a pair of electrodes. Displays employing this technology produce light as a function of the current between the two electrodes when the electro-luminescent materials are electrically stimulated. Electro-luminescent displays are primarily classified as active-matrix or passive-matrix displays. Active-matrix displays employ a relatively complex, active circuit at each pixel in the display to control the flow of current through the electro-luminescent material layer(s). The formation of this active circuit at each pixel can be expensive and often the performance of these circuits is somewhat limited. For example, when controlling current to a light-emitting element, circuits provided in low temperature polysilicon often exhibit spatial nonuniformities while circuits provided in amorphous silicon often exhibit severe threshold shifts over time.

Passive-matrix EL displays are much simpler in their construction. The display generally includes an array of row electrodes and an array of column electrodes. EL materials are deposited between these electrodes, such that when a positive electrical potential is created between the two electrodes, the EL material between these two electrodes emit light. Therefore, each light-emitting element in the display is formed by the intersection of a row and a column electrode. As this type of display does not require the costly formation of active circuits at each pixel site, they are much less expensive to construct. In these devices, the column electrode is typically formed of ITO or some other material that is transparent but typically higher in resistivity than the row electrode, to allow light to be visible to the user.

Numerous passive matrix EL display systems have been described in the literature. For example Okuda et al. in U.S. Pat. No. 5,844,368, entitled "Driving system for driving luminous elements" describes a system for driving a passive matrix EL display. In this method, and in most traditional passive matrix EL drive methods; it is assumed that a power is provided to one row electrode at a time and flows through the EL material to each of the column lines. This method of driving the display by providing power to only one line of light-emitting elements leads to two significant problems.

The first of these two problems, occur because each display will ideally have hundreds of lines of light-emitting elements, which implies that each light-emitting element will only emit light for a very short period of time. Therefore each light-emitting element will be required to emit light with a very high luminance to achieve a reasonable time-averaged luminance value. Since light intensity from these devices is proportional to current, relatively high currents must be provided to each light-emitting element. This can significantly shorten the lifetime of the individual light-emitting elements and increase cross-talk between pixels in the display as described by Soh, et al, in a paper entitled "Dependence of OLED Display Degradation on Driving Conditions" and published in the proceedings of the SID Mid Europe Chapter in 2006. Further this drive method requires drive electronics to support high currents, which usually translate to larger, more expensive silicon drive chips; and leads to high resistive voltage and power losses across the electrodes, especially the row electrodes which provide current to potentially hundreds of light-emitting elements simultaneously.

The second of these two problems occur because each light-emitting element must be turned on and off during each cycle to avoid current leakage, and therefore light emission, through light-emitting elements that are supposedly not activated. This problem is particularly troubling in EL displays employing organic materials since the EL layers are very thin and are highly resistive. In such displays, each light-emitting element has a significant capacitance that must be overcome before light emission can occur. Overcoming this capacitance can require significant power that does not generate light and is therefore wasted. This issue has been discussed by Yang et al. in a paper entitled, "PMOLED Driver Design with Pre-charge Power Saving Algorithm" as published in the 2006 SID Digest. As this paper states, this power increases significantly as the number of lines in the display is increased. Specifically, this paper points out that for a PM OLED having 64 lines, nearly 80% of the power is spent driving the OLED (i.e., for light production), while 20% of the power is spent overcoming this capacitance as the lines are turned on and off. As the resolution increases, this ratio changes dramatically, such that when there are 176 lines, only 57% of the power is spent in the production of light while 43% of the power is spent overcoming this capacitance. Therefore, the display becomes significantly less energy efficient, as more lines are present on the display to be cycled from off to on.

Each of these problems can significantly limit the use of passive matrix EL displays. However, in combination, these two problems limit the application space for such displays significantly. Today, the application of passive matrix EL displays are limited to displays that generally have less than 128 lines and are typically less than 1.5 inches in diagonal.

One category of approaches for addressing at least the first of these two problems is to provide multi-line addressing of passive matrix EL displays. Such methods have the potential to reduce the peak current through any EL light-emitting element, which can extend the lifetime of the material and significantly reduce the drive voltage. Further, since multiple rows can be engaged simultaneously, the power losses due to the resistivity of the electrodes can be reduced significantly.

In US Patent Publication No. 2004/0125046, entitled "Image Display Apparatus", by Yamazaki et al., one such multi-line addressing method is provided. While disclosed primarily for use in surface-conduction type electron emitting devices, this approach was also been discussed for EL displays. In this approach, any input image signal that has fewer vertical addressable pixels than the vertical addressability of the display is displayed by receiving the input video signal, providing a horizontal edge emphasis process (i.e., edge sharpening) across the column direction of the display, selecting two or more rows of the display, and modulating the voltage to the columns of the display in response to the processed input image signal. This approach requires relatively straightforward image processing to prepare the image signal and is able to employ drivers that are very similar to existing passive matrix drivers. While this method may reduce the drive current and voltage as compared to a display employing one line at a time drive techniques as known in the prior art, simply providing the same signal on two neighboring lines, results in an image with a substantial loss in sharpness in the vertical direction and the edge emphasis process can provide only a limited level of enhancement. Therefore, while it is possible to use this method to provide a relatively good display when simultaneously selecting two rows of the display at a time and under certain circumstances it may be useful to select three rows at a time, the number of rows that can be employed simultaneously without introducing significant levels of image blur is quite limited.

Sylvan in EP 1 739 650, entitled "Procédé de pilotage d'un dispositif d'affichage d'images à matrice passive par selection multilignes" has proposed an enhancement to this method in which multiple rows are selected during one refresh of the display but a single row is selected during subsequent display refresh cycles. This approach overcomes at least a portion of the sharpness issues but requires that the display actually be cycled more often, further increasing the number of charge and discharge cycles and therefore increasing the power to capacitance. In a paper entitled "Multiline Addressing by Network Flow" by Eisenbrand et al., a similar approach has also been discussed. This approach allows some cycles to be completed using even more rows simultaneously but employs a hierarchical approach that once again requires the use of an increased number of charge and discharge cycles.

A different approach has more recently been discussed by Smith et al. in PCT filings WO 2006/035246 entitled "Multi-line addressing methods and apparatus", WO 2006/035248 entitled "Multi-line addressing methods and apparatus" and WO 2006/067520 entitled "Digital Signal Processing Methods and Apparatus". These disclosures provide a method for decomposing an input image into subframes, using mathematical methods such as singular value decomposition and then displaying these subframes by controlling multiple rows and columns in an emissive display simultaneously. An interesting difference between this approach and the prior approaches is that the prior approaches provided only a single scan signal value to the selected row columns and typically provided a digital time multiplexed signal to the columns. The approach provided by Smith requires that multiple drive levels be provided on both the column and row electrodes. In fact, the method as described requires full analog control over the signals provided on the row and column electrodes and possibly requires that the current to each of these electrodes be controlled. While this adds complexity to the drivers, it also allows more control that can be used to engage more rows simultaneously with fewer artifacts. Unfortunately, the methods described in each of the disclosures by Smith, suffer from a number of shortcomings. Most importantly, the decomposition methods described are complex and difficult to realize in real time, especially when processing full frames of video information.

SUMMARY OF THE INVENTION

In accordance with the present invention there is provided a passive matrix, electro-luminescent display system for receiving an input image, processing such input image, and displaying such processed image, comprising:

a. a passive matrix, electro-luminescent display having an array of column electrodes, an array of row electrodes which is oriented orthogonally to the array of column electrodes and an electro-luminescent layer located between the array of column electrodes and the array of row electrodes; the intersection of each column and row electrode forming an individual light-emitting element;

b. one or more row drivers for providing separate signals at different times to different groups of row electrodes within the array of row electrodes; wherein the row electrodes of each group simultaneously receive at least two different level signals;

c. a display driver for receiving the input image signal and processing this input image signal to provide a presharpened image control signal; and d. one or more column drivers responsive to the presharpened image control signal for simultaneously providing a signal to the multiple column electrodes within the array of column electrodes at the same time signals are provided to the groups of row electrodes so that the concurrence of row and column signals causes individual light-emitting element to produce light.

The present invention is suitable for controlling a relatively large number of row electrodes simultaneously in a passive-matrix electro-luminescent display that is computationally simple, significantly reduces the peak current to any individual light-emitting element under all conditions, and that results in reduced image quality artifacts. The present invention reduces the power loss due to IR drop along the row electrode and power losses that are due to charging and discharging the capacitance of the display. The present invention can enable higher resolution, larger, and more valuable passive matrix, electro-luminescent displays.

DETAILED DESCRIPTION OF THE INVENTION

Figure 1A:
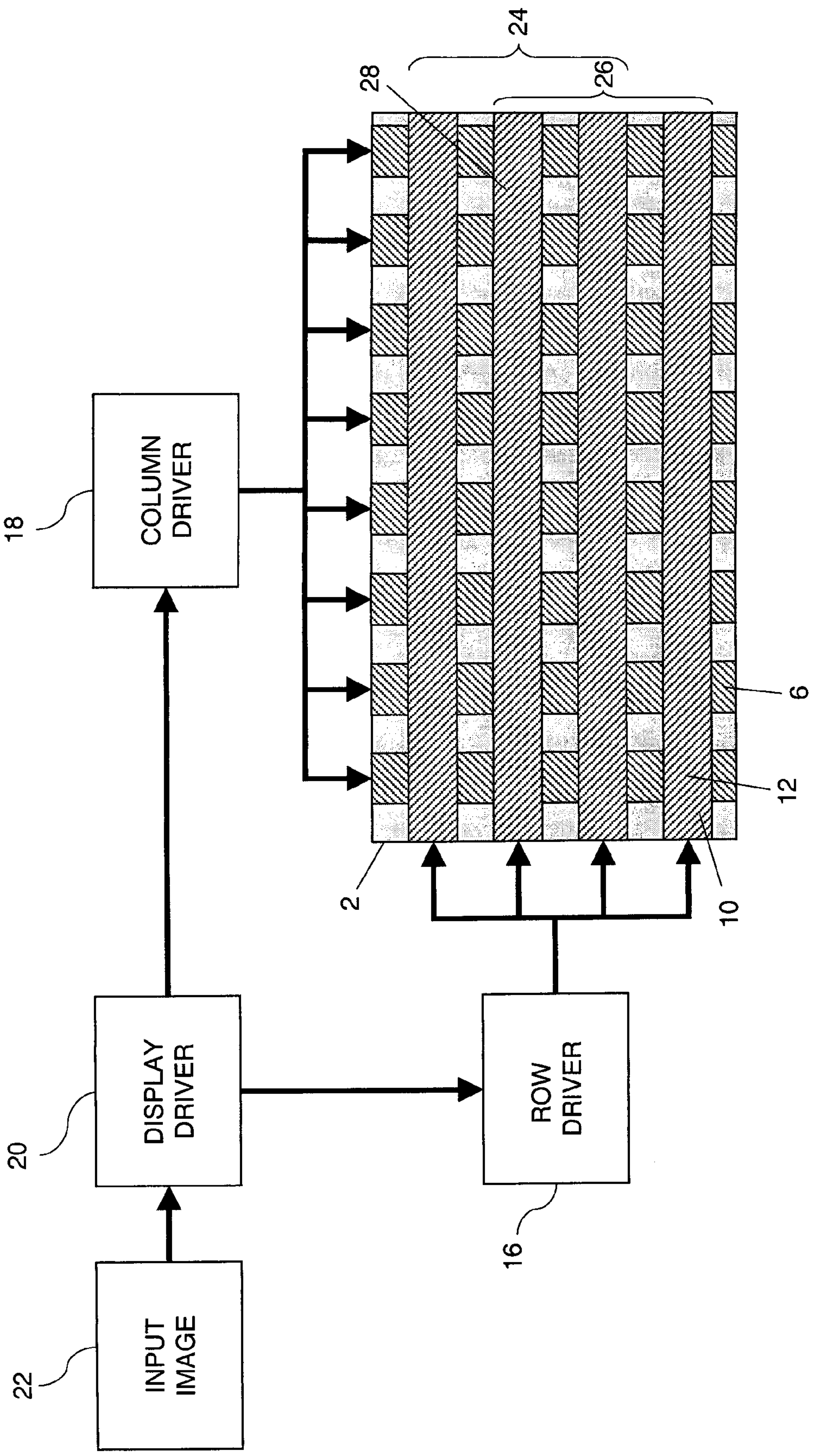
FIG. 1A is a schematic diagram of a system of the present invention.

By providing a passive matrix, electro-luminescent display system as shown in FIG. 1, peak drive current is reduced. As will be discussed, the display driver 20 receives an input image signal 22 and performs a presharpening step on this image signal to produce a presharpened image control signal. The one or more row drivers 16 simultaneously provide a fixed set of drive signals to a group of row electrodes 24 within the array of electrodes that form the display 2 during one time interval and at a different time interval presents separate signals to another group of row electrodes 26 within the array of row electrodes. During each time interval, the row drivers 16 provide at least two different drive levels to the group 24 of row electrodes. Preferably the at least two drive levels will be used to drive a group of at least three row electrodes and these at least two drive levels will be distributed to have a peak near their center and to have lower, nonzero values on either side of the peak. As the at least two drive levels are provided to a group of row electrodes 24, 26, the one or more column drivers 18 will respond to the presharpened image control signal to simultaneously provide a signal to the multiple column electrodes within the array of column electrodes, such that the concurrence of the row and column signals causes individual light-emitting elements to produce light.

The display driver 20 can presharpen each subsequent line in the input image signal 22 in the same way, the one or more row drivers can provide the same fixed set of drive signals to a different group of row electrodes (i.e., 26) within the display 2, and the one or more column drivers will respond to the subsequent line of the presharpened image control signal during subsequent time intervals to simultaneously provide a signal to the multiple column electrodes within the array of column electrodes such that the concurrence of the row and column signals causes other individual light-emitting elements to produce light. By selecting proper combinations of presharpening filters and row drive signals, the passive matrix, EL display system can provide high quality images using groups 24, 26 of typically 3 or more row electrodes. Utilizing such a method to display images on a passive matrix EL display can significantly reduce the peak drive current through any EL light-emitting element 12 and along any row electrode 10, thereby reducing the power consumption of the EL display system, while requiring the display driver 20 to perform only relatively simple image processing of the input image signal 22.

Figure 1B:
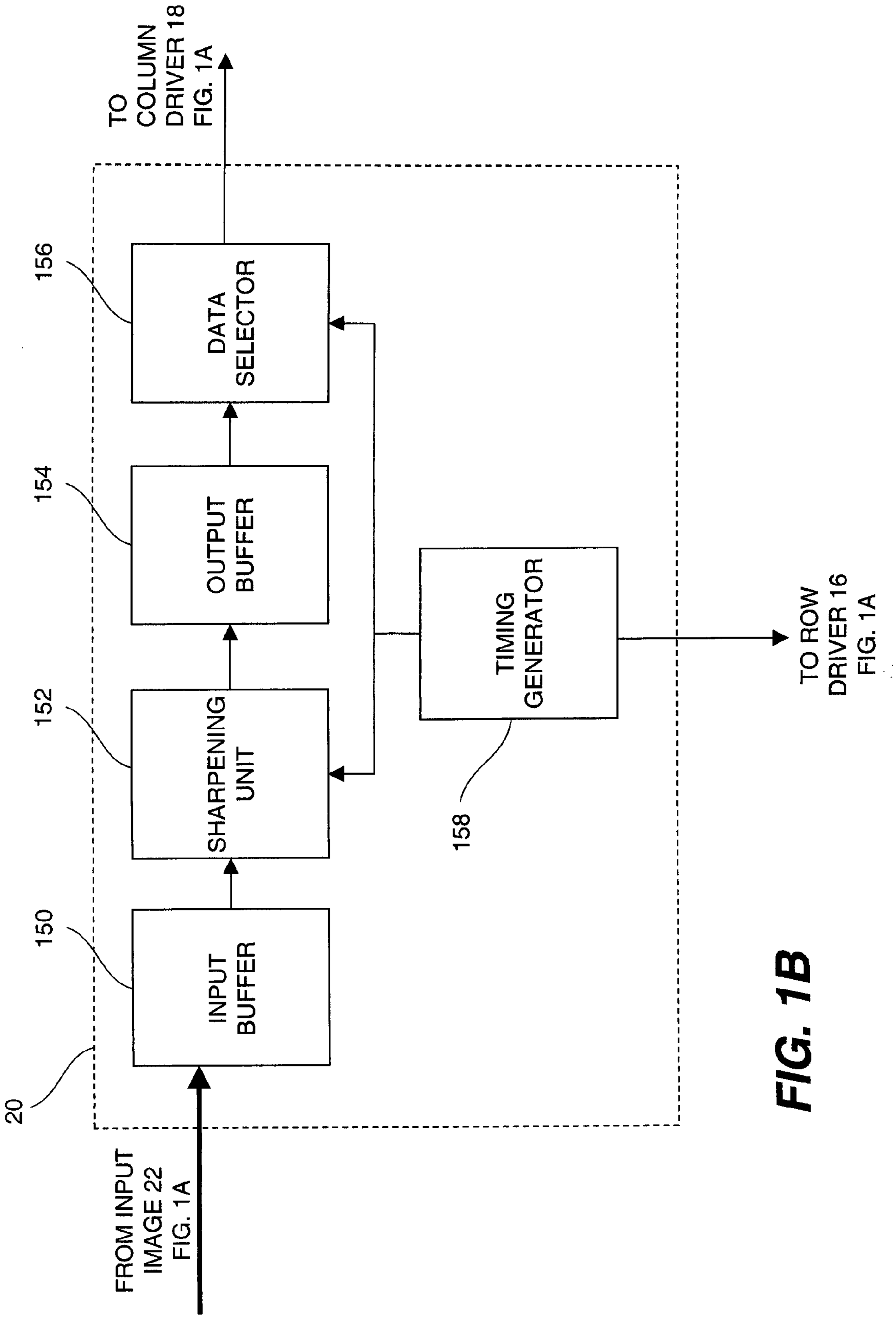
FIG. 1B is a schematic diagram of a display driver useful in practicing the present invention.

A more detailed description of a passive matrix EL display system of the present invention will now be provided. As shown in FIG. 1A, this system will typically be comprised of a passive matrix, electro-luminescent display 2, one or more row drivers 16, one or more column drivers 18, a display driver 20, and a source for an input image signal 22. Generally, the display driver will perform any necessary image processing, including presharpening, and provide at least timing signals to the row drivers 16 and signals corresponding to the presharpened image control signal to the column drivers 18, which will then provide voltage or current values to the row 10 and column electrodes 6. These signals will control the current through each light-emitting element 12, which are defined by the intersection of each of the row 10 and column electrodes 6.

The display driver 20 can be any digital or analog device capable of receiving an input image signal 22, presharpening the image signal, and providing this image signal to the one or more column drivers 18 while at least providing a timing signal to one or more row drivers 16. This display driver 20 can be embedded in a higher-level processor, for instance it can be embedded within the primary digital signal processor of a cellular telephone or a digital camera. The display driver 20 can alternatively be a stand-alone device, such as a stand-alone digital signal processing ASIC or field programmable gate array. The display driver will typically include the elements shown in FIG. 1B. As shown, the display driver 20 will include an input buffer 150. This input buffer 150 will receive and temporarily store a portion of the input image signal 22, which will typically include multiple rows of the input image. Also shown is a sharpening unit 152, which will then presharpen the input image signal 22. The timing generator 158 will provide a timing signal to the sharpening unit 152, to allow the data to be read from the input buffer at the appropriate time. Once the input image signal has been presharpened, the presharpened image control signal will be stored in an output buffer 154. Typically, the output buffer 154 will be a full frame buffer and will store as many rows of the presharpened image control signal as there are row electrodes 10 within the display 2. The data selector 156 will respond to a signal from the timing generator to provide the presharpened image control signal from the output buffer 154 to the column driver 18, shown in FIG. 1A. The timing generator 158 will also provide a control signal to the row driver 16 in FIG. 1A to insure that the one or more row drivers 16 and the one or more column drivers 18 such that the concurrence of the row and column signals causes individual light-emitting elements to produce light. In some embodiments, the display driver 20 can further include a unit (not shown) for selecting row drive values and providing these row drive values to the row driver 16.

Figure 2:
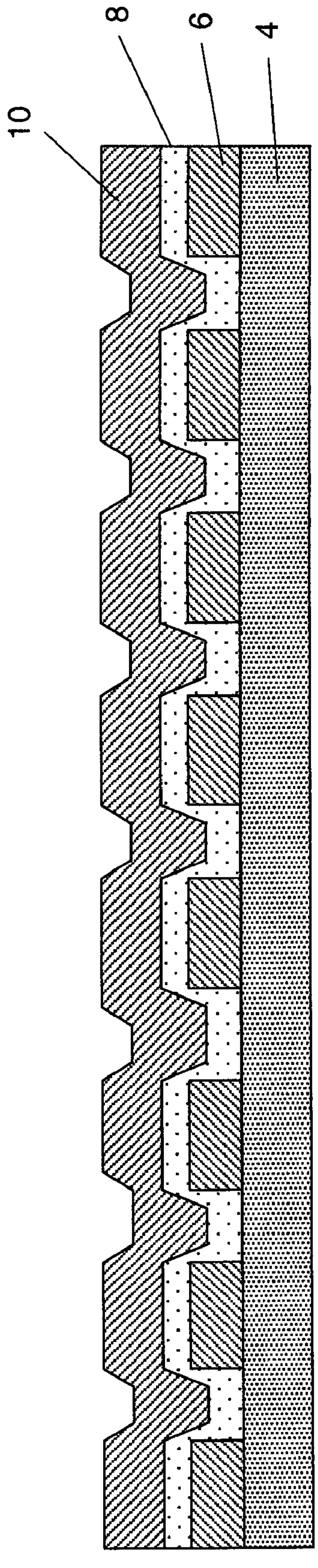
FIG. 2 is a cross sectional diagram of an electro-luminescent display of the present invention.

A cross-section of the display 2 is shown in FIG. 2. This display 2 will normally be formed on a substrate 4. An array of column electrodes 6 will typically be formed on this substrate 4. An electro-luminescent layer 8 will then be deposited over the column electrodes 6. Finally, an array of row electrodes 10 will be deposited over the electro-luminescent layer 8. These row electrodes 10 will be oriented orthogonal to the array of column electrodes 6 as shown in FIG. 1. One of these electrodes, typically the row electrode 10, will serve as a cathode while the remaining electrode, typically the column electrode 6, will serve as the anode. The light-emitting element 12 will then produce light with an intensity that varies as a function of the current that flows from the cathode to the anode.

It should be noted that FIG. 1 shows the row electrodes 10 extending horizontally across the display 2 and the column electrodes 6 extending across the vertical dimension of the display 2. However, one skilled in the art will recognize that the electrodes are described in this way for a matter of convenience. These orientations are not necessary as long as the two arrays of electrodes 6, 10 are, in fact, orthogonal to one another. It should be noted further, that FIG. 2 shows the column electrodes 6 as patterned on the substrate 4 and the row electrodes 10 as deposited over the electro-luminescent layer 8. Once again, those skilled in the art will recognize that these particular locations are shown as a matter of convenience and the relative position of the two electrodes with respect to the substrate, are of no consequence to the present invention, as long as the electro-luminescent layer 8 is located between the row electrodes 10 and the column electrodes 6.

The display system shown in FIG. 1 will further include one or more row drivers 16. In this system, these row drivers 16 will simultaneously provide a set of drive signals to a group of row electrodes 24 within the array of row electrodes while presenting any single image. Within this system, the row drivers 16 provide at least two different drive levels to the group of row electrodes 24 during each time interval and the at least two drive levels are preferably distributed to have a peak for the row electrode 28 near the center of the group of row electrodes 24 and to have lower, nonzero values on either side of the peak. These row drivers 16 will typically serve as current sinks. The row drivers 16 can be designed to provide only a fixed set of drive levels or they may be programmable such that different sets of drive values can be selected or input by the display driver 20.

Further, the system will include one or more column drivers 18. These column drivers 18 will simultaneously provide a signal to multiple column electrodes within the array of column electrodes. By providing a signal to multiple row electrodes and multiple column electrodes simultaneously, a two-dimensional array of light-emitting elements 12 will be simultaneously powered to produce light.

Figure 3:
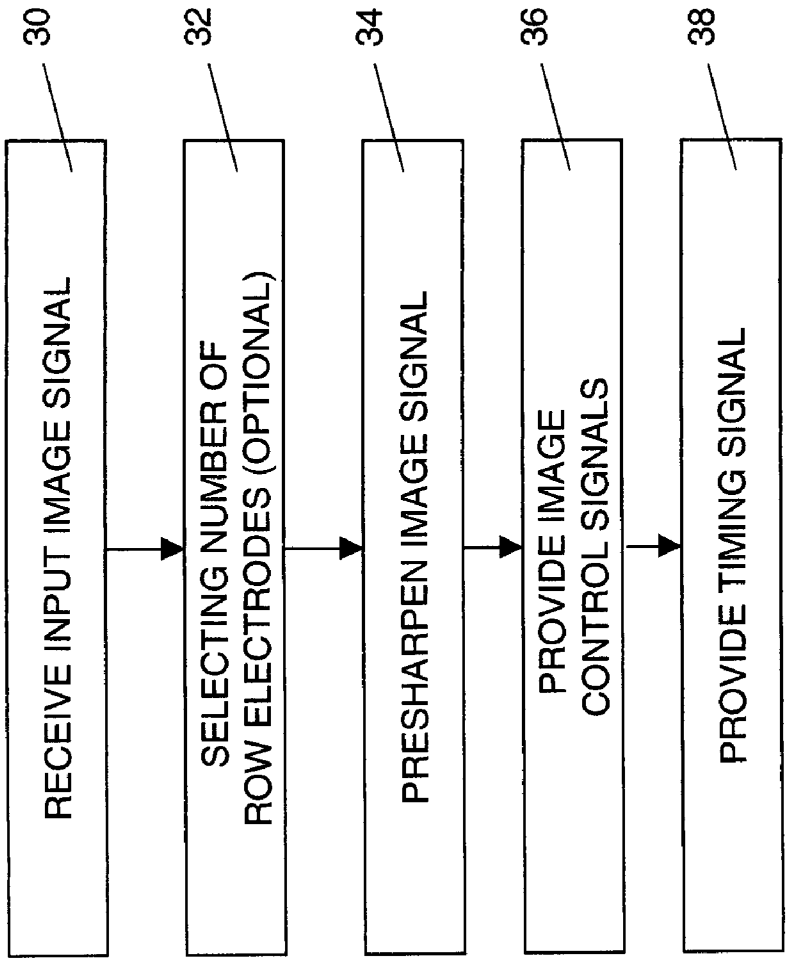
FIG. 3 is a flow diagram depicting a process useful in employing the present invention.

The display driver 20 shown in FIG. 1, will receive a two-dimensional input image signal 22 and process this input image signal to provide control signals to the row 16 and column 18 drivers. The display driver 20 of the present invention will perform the basic process shown in FIG. 3. As shown, this process includes: receiving an input image signal 30; optionally selecting the number of row electrodes 32 to employ and their relative signal levels; presharpening the input image signal 34 in a direction that is orthogonal to the axis implied by the direction of the row electrodes 10; and providing 36 a presharpened image control signal to the column 18 drivers for driving the display while providing a signal, typically at least a timing signal 38, to the row drivers 16. The row and column drivers 16, 18 then simultaneously provide signals to multiple row electrodes 10 and column electrodes 6 that allow light-emitting elements 12 at the intersection of multiple row electrodes 10 and multiple column electrodes 6 to produce light simultaneously. Since the row electrodes have multiple drive values, they produce light simultaneously such that the light, produced orthogonal to the row electrodes, varies across the multiple row electrodes.

Typically, the input image signal 22 can include a two-dimensional array of code values for driving each color of light-emitting element 14 within the display. However, it may also be an analog signal. The presharpening step 36 will typically be performed as a digital processing step, but can also be performed within the analog domain. The steps of providing 36, 38 signals to the row 16 and column 18 drivers may also provide digital signals. The display driver 20 will typically buffer as many lines of the input image signal as are required to perform the presharpening step 34. The presharpening step 34 will then be performed. The output data can then be stored within the output buffer 154 for later presentation. This output buffer 154 may be required as it is typical for the data rate of the input signal to be 30 frames per second or less and the display is often scanned at rates of 60 Hz or greater. Further, it is not necessary to scan the display lines in the same order they are received and this output buffer 154 can be useful in facilitating a change in the order of presentation of the rows within the two dimensional array of code values.

The row 16 and column 18 drivers will typically provide voltages and current signals to the row 10 and column 6 electrodes, which may also be digital or analog in nature. In an embodiment of the present invention, the row drivers 16 can switch the voltage on any row electrode 10 among a discrete set of values. One of these values will typically not allow current to flow through the light-emitting elements 12 with a forward bias when the voltage of the column drivers are switched to allow current flow through selected row electrodes 10. The row drivers 16 will also be capable of providing at least two and preferably several additional voltages that allow current to flow through the light-emitting elements 12 with a forward bias when the voltage of the column electrodes 6 is switched appropriately. However, the row drivers 16 may also provide a continuous analog voltage signal rather than a set of discrete values.

The column drivers 18 may modulate the voltage values between two voltage values and the luminance of the light-emitting elements 12 will be modulated by modulating the time that current is allowed to flow through the light-emitting elements 12 (i.e., the column drivers may employ time division multiplexing). However, the column drivers 18 may also provide an analog voltage signal to the column electrodes 6 and modulate the luminance of the light-emitting elements 12 by modulating the voltage of the signal.

The system and method of the present invention provides a fundamentally different approach to multi-line addressing in electro-luminescent displays than provided in the prior art. The prior art approaches described by Yamazaki and Sylvan require straight forward presharpening steps to be performed but provide only a fixed drive level for each row electrode. The restriction of providing only a fixed drive level for each row electrode prevents these approaches from utilizing more than a small group of 2 or 3 row electrodes simultaneously without introducing significant image artifacts. On the other hand, Smith and Eisenbrand each provide for multiple drive levels for each of a group of row electrodes, however, these drive levels are dependent upon the image content making it difficult to reduce reliably the current on any row electrode to a fixed level and, more importantly, these methods require relatively complex two-dimensional image processing, making it difficult to perform the necessary calculations cost effectively and in real time. The approach provided herein, requires the display driver to only perform straightforward presharpening with multiple row drive levels. The applicants have demonstrated that by properly selecting the multiple row drive levels in concert with the proper presharpening methods, high quality images can be obtained while simultaneously driving relatively large numbers of row electrodes. In fact, to achieve large reductions in current with minimal impact on image quality, it is often useful to employ more than 5 and often more than 10 row electrodes simultaneously.

To illustrate the advantages of the current approach, examples will be provided for three separate methods of driving a passive matrix EL display according to the present invention. Each example will employ a different set of row electrode drive values in combination with a different presharpening kernel to achieve different levels of peak current reduction. It should be acknowledged that although a passive matrix EL display system of the present invention can apply one of these approaches for displaying a single image, the system can be adjusted in response to factors, such as the resolution of the display or the frequency content of the input image signal, to apply different presharpening kernels and sets of row drive values to achieve acceptable tradeoffs in image quality and power consumption.

Figure 4:
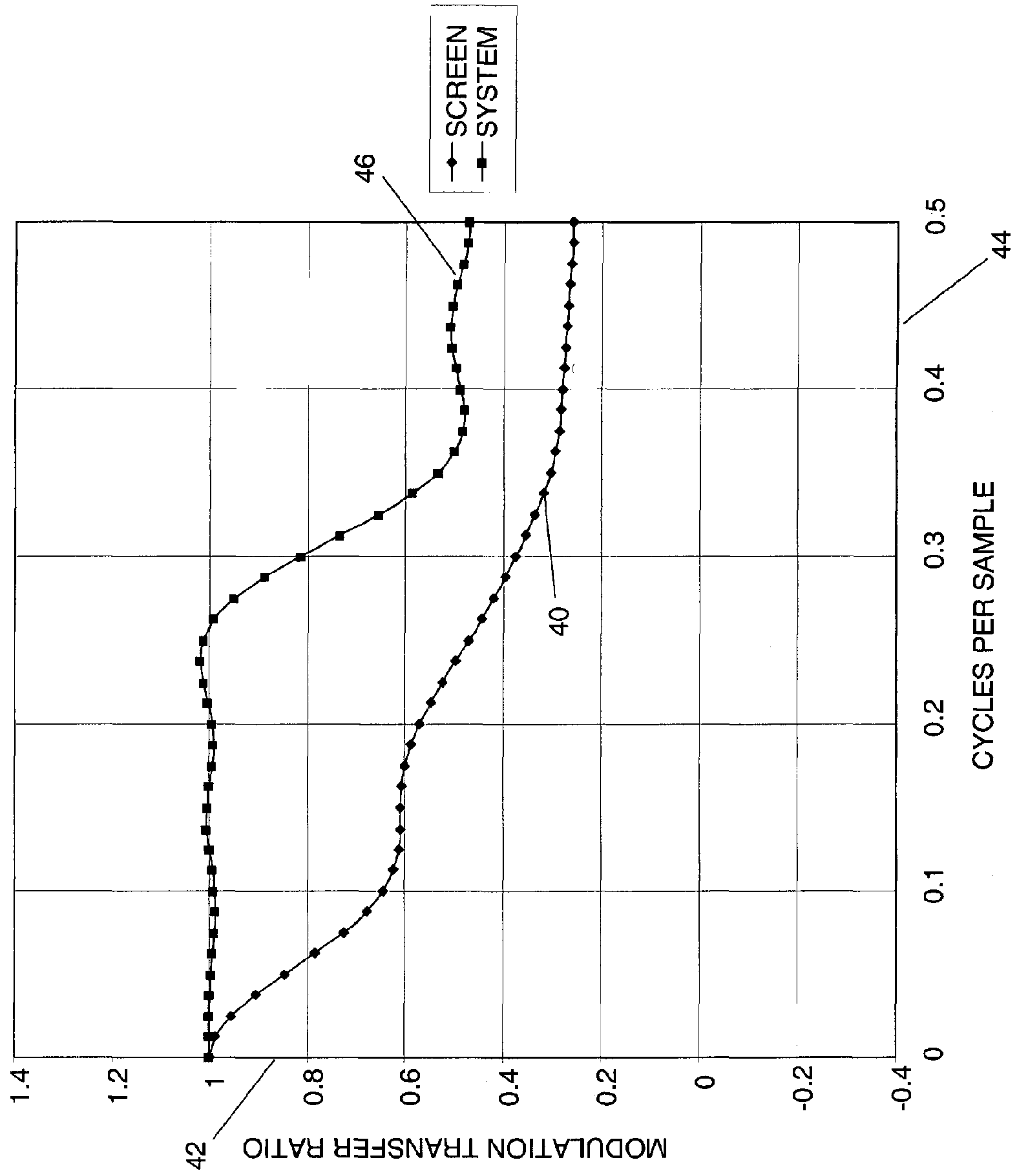
FIG. 4 is a plot depicting the modulation transfer function of a system of the present invention with and without presharpening.

In a first example, a set of row drive values and a presharpening kernel will be demonstrated that can reduce the peak current of the display device to 50% of the peak current that would be required to present an image on a traditional passive matrix display employing one line at a time to construct the output image. To attain this image, the row electrodes will be driven such that a total of 15 electrodes form a group of row electrodes 24, 26 and will be activated simultaneously. The row electrodes will further be driven such that the percentage of current sunk by each of the row electrodes will be distributed as shown in Table 1. Note that there at least two different drive levels provided in Table 1. In fact, a total of 15 drive levels are shown. Further the drive levels are distributed to have a peak near their center and to have lower, nonzero values on either side of the peak. That is the maximum relative drive value is provided for the center row electrode (i.e. row electrode 8) and lower drive values are provided for row electrodes on either side of this peak. It should also be noted, however, that this function does not decrease monotonically as the distance from the center electrode increases. Note specifically that the drive value for row electrodes 5 and 11 are smaller than the drive values for row electrodes 6 and 10 but larger than the drive values for row electrodes 4 and 12. That is, as the distance from the center electrode increases, the electrode drive values decrease, increase to a secondary maximum at electrodes 4 and 12 and then decrease for the row electrodes in the group of row electrodes. When the row electrodes are driven in this way and this distribution of row electrodes is scanned down the display, the display system will have a native vertical modulation transfer function 40 as shown in FIG. 4. To interpret this function, some characteristics of this modulation transfer function should be explained.

TABLE 1

| Row Electrode Number | Relative Current Values |
|---|---|
| 1 | 0.005 |
| 2 | 0.01 |
| 3 | 0.02 |
| 4 | 0.025 |
| 5 | 0.015 |
| 6 | 0.03 |
| 7 | 0.145 |
| 8 | 0.5 |
| 9 | 0.145 |
| 10 | 0.03 |
| 11 | 0.015 |
| 12 | 0.025 |
| 13 | 0.02 |
| 14 | 0.01 |
| 15 | 0.005 |

Figure 5:
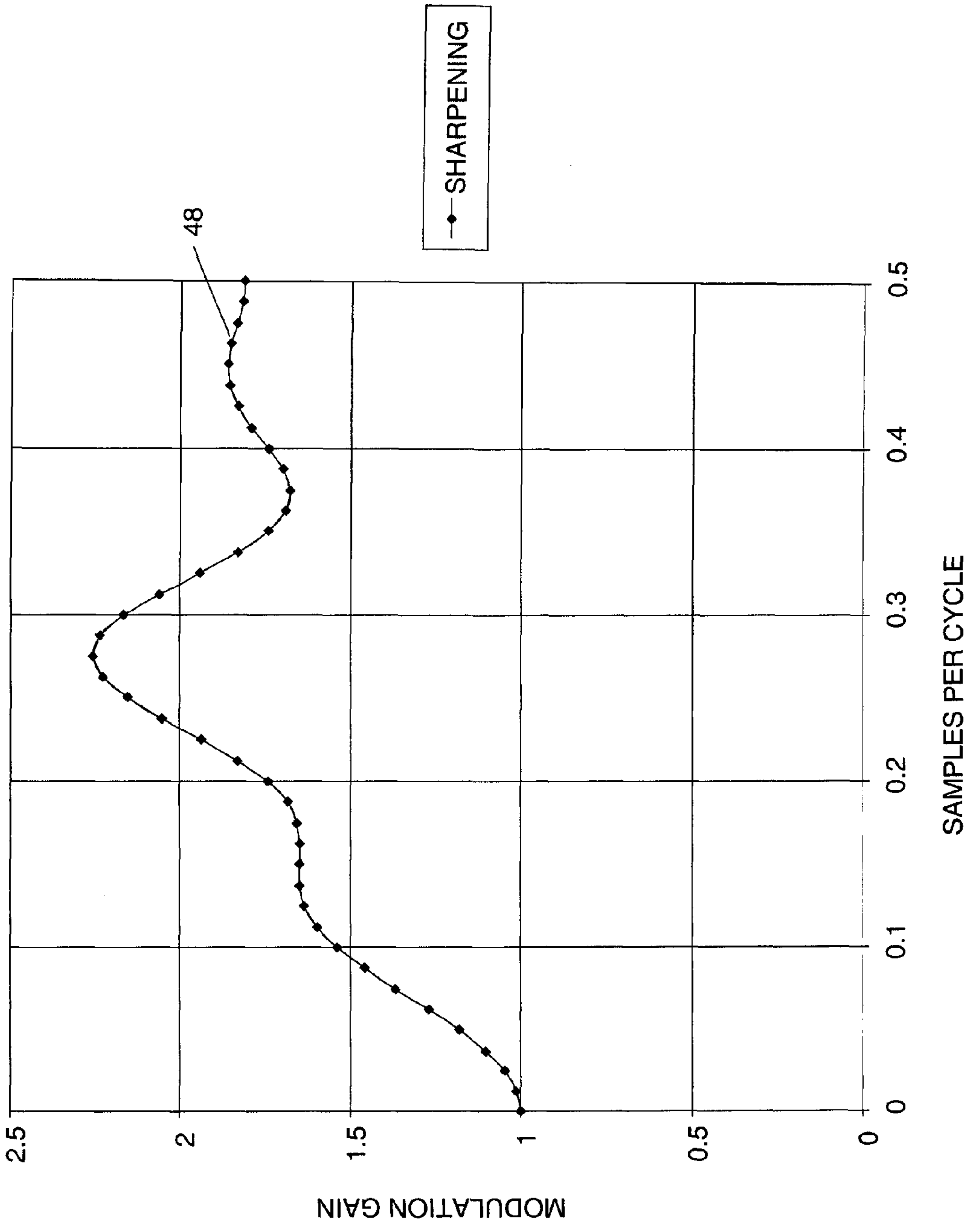
FIG. 5 is a plot depicting the modulation gain of the presharpening method employed to achieve the presharpened modulation transfer function of FIG. 4

First, it should be understood that the modulation transfer function of a perfect display would have a value on the modulation axis 42 of 1 between zero and 0.5 cycles/sample on the frequency axis 44 and a value of zero at exactly 0.5 cycles/sample. Further, if the modulation transfer function crosses the frequency axis at any value lower than 0.5 cycles per sample, spatial information is lost in the image and cannot be recovered. However, if the modulation is decreased, this loss can be compensated through the use of presharpening, although some loss in bit depth can occur. It is also important to recognize that while the modulation transfer function of a perfect display would have a value on the modulation axis 42 of 1 between zero and 0.5 cycles/sample, no practical systems achieve this ideal goal and adequate image quality can be achieved for systems that have values on the modulation axis 42 that are significantly less than 1 for values on the frequency axis 44 that are somewhat less than 0.5. The native modulation transfer function 40 of this system is shown in FIG. 4. For the present embodiment of this invention the modulation transfer function 40 crosses the frequency axis 44 at about 0.5 cycles/sample and is positive for all frequencies lower than 0.5 cycles/sample. Therefore, one can use presharpening to restore the modulation of the image at all spatial frequencies that the display can present. In the current invention, this presharpening is accomplished, for example, by applying a vertical presharpening kernel having the values 4, −5, −8, 4, −4, −19, −18, 220, −18, −19, −4, 4, −8, −5, 4, then normalizing the result by dividing the resulting values by 128. FIG. 5 shows the spatial frequency response of this presharpening kernel 48. Note that this presharpening kernel provides a modulation value significantly greater than 1 for all vertical spatial frequencies at which the native modulation transfer function of this system 40 is significantly less than 1 and, therefore, at least partially compensates for the loss of modulation at all spatial frequencies that are attenuated by driving multiple row electrodes according the present invention. After this presharpening kernel is applied, the final system modulation transfer function 46 is greater in modulation than the native modulation transfer function of this system 40 for all spatial frequencies where the native spatial frequency response of the system 40 is less than 1. Simulations performed by the inventors have demonstrated that images having this resulting MTF are quite acceptable and often are visually lossless as compared to images displayed using the one line at a time drive method.

It is worth returning to the discussion of the row drive values shown in Table 1. As noted earlier, these row drive values do not decrease monotonically, but instead contain a valley. The presence of this valley within the row drive values has the result of flattening the system MTF 40 between the spatial frequencies of about 0.1 to 0.2 cycles per sample. The presence of this plateau allows one to obtain values on the modulation axis 42 for these mid-frequencies (i.e., 0.1 to 0.2 samples per cycle) while applying presharpening kernels with relatively small gain values. It is important that the maximum gain value for the presharpening kernel is only 2.26 and would have been much larger had the row drive values declined monotonically from the center row electrode.

Figure 6:
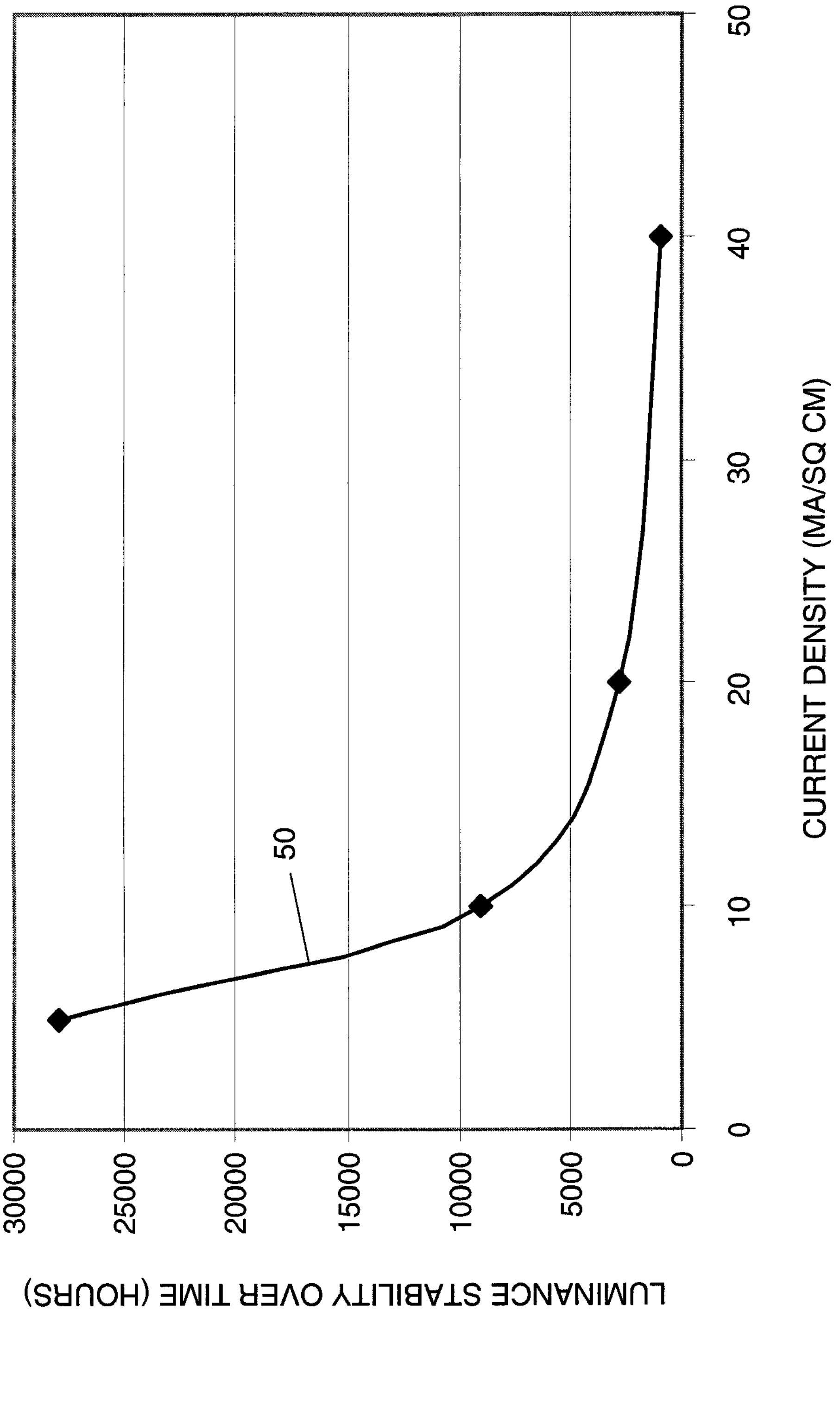
FIG. 6 is a plot depicting the typical luminance stability of an organic light emitting diode as a function of current density.

This method has several advantages. First, the peak current is reduced to 50 percent of the peak value for a traditional one line at a time system. This fact allows the lifetime of EL materials to be extended. In one example, it is known that EL displays employing organic materials degrade as a function of current density as shown by the relationship 50 in FIG. 6. Notice that this relationship is highly nonlinear and therefore even a slight reduction in current density can produce a dramatic increase in the luminance stability or lifetime of the EL materials. By reducing the peak current to 50 percent of that which would be required if one were to employ a traditional 1 line at a time drive method, the maximum current density is also reduced by 50 percent, typically extending the lifetime by something on the order of a factor of 4 or more.

Figure 7:
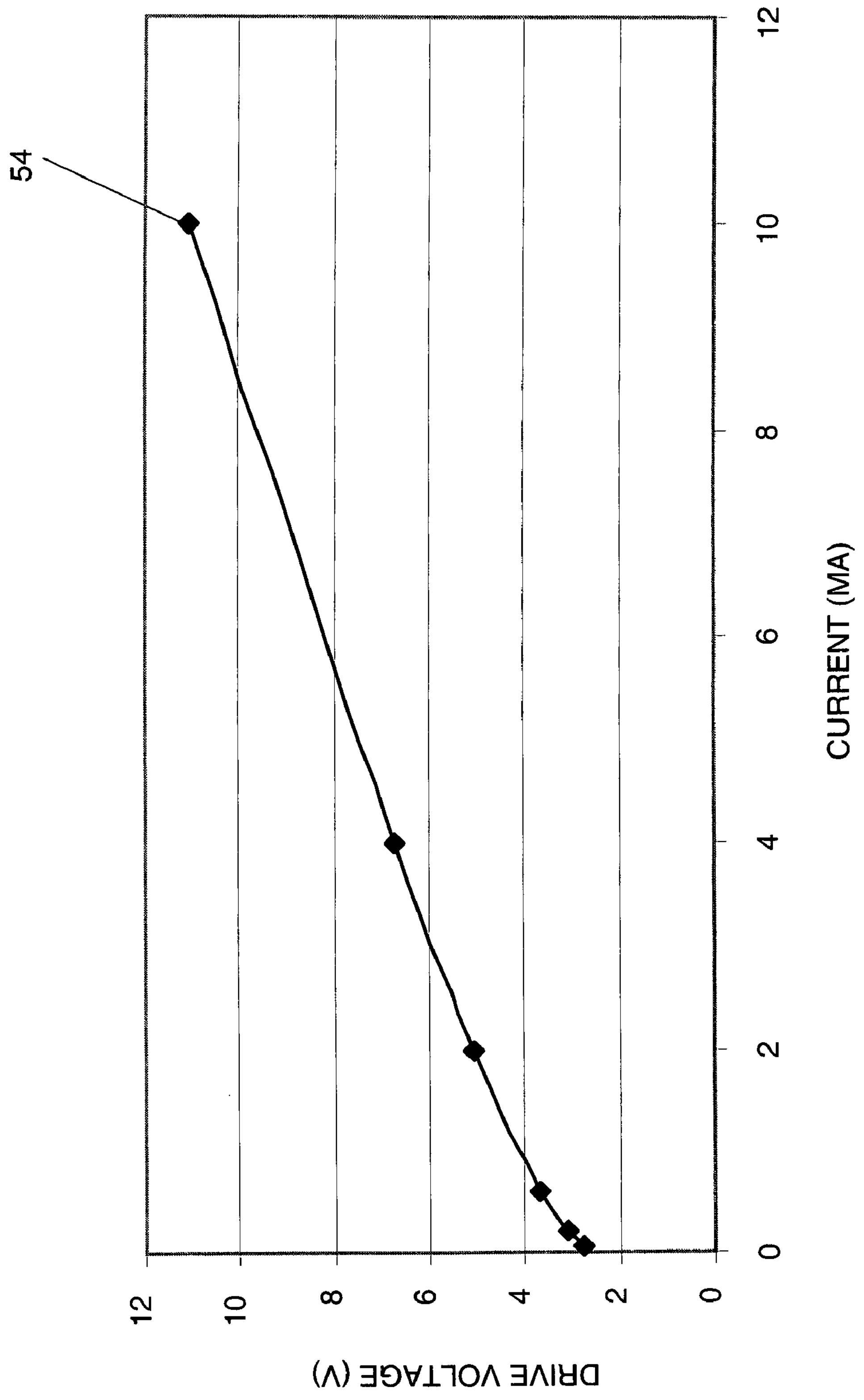
FIG. 7 is a plot depicting drive voltage as a function of drive current for a typical organic light emitting diode useful in a display of the present invention.

Second, luminance is linearly related to current in an EL display system, implying that to maintain the luminance of the current display system as compared to prior art solutions, the same time averaged current must be provided through the display system. However, the use of lower peak currents reduces the required voltage to produce this luminance. FIG. 7 shows the drive voltage function 54 between drive current (mA) and Drive Voltage (V). By reducing the peak drive current, the drive voltage is reduced and since power is computed by multiplying the current and the voltage, the power consumed by the display to produce light is reduced as a function of the peak display current.

Third, in traditional passive matrix display systems employing one line at a time addressing, the row electrodes typically have a significant resistivity and the row currents can be on the order of several hundred milliamperes and, for larger displays, several amperes. Therefore, the loss of power due to $I^2R$ loss along the row electrodes can be significant. By distributing this current over several row electrodes, the current on any single row electrode is reduced significantly and therefore the loss of power due to $I^2R$ loss is reduced significantly, further reducing the power consumption of the display.

It should be noted that in this example, a total of 14 rows were driven simultaneously. Generally, the number of rows that will be driven simultaneously using this method will be five or greater but the method can be applied by driving as few as three lines simultaneously. It should also be noted that the drive level for the center electrode in the group of row electrodes that are driven simultaneously is higher than for any of the other row electrode in the group of row electrodes. Although, one can employ this method by applying two or more center electrodes which all have the same drive values, the method will often employ drive values for the row electrodes furthest from the center that are lower than the drive values for these center electrodes. Further, the drive level will generally decrease for electrodes in the group of row electrodes as the distance from the center row electrode within the group increases. This decrease in drive level may be monotonic such that the distribution of electrode drive values as a function of row electrode location approximates a gaussian function. The fact that the drive values generally decrease with increasing distance from the center electrode is an important attribute since without this attribute, the native spatial frequency response of the system 40 will be zero for a spatial frequencies less than 0.5 cycles per sample and it will therefore be difficult to construct an image having acceptable quality. It is important that the frequency response of a gaussian is a gaussian and such a system modulation transfer function response can be relatively accurately compensated for using traditional presharpening filters. However, interrupting this gaussian by imposing a secondary maximum within each of the tails of the generally gaussian-shaped function for driving the group of row electrodes provides a more advantageous system modulation transfer function.

In this embodiment only 8 different row drive values are required but one can construct a row driver according to the present invention that drives rows with as few as 2 different row drive values. To implement such a system, one can construct a row driver that is capable of providing only a few discrete voltage or current sink signal levels. Alternately, these row drivers may provide full analog control of the row drive voltages or current sink values. These drive values can then be programmed and updated by the display driver to provide different sets of row drive signals to different row electrodes.

These row drivers may be used together with column drivers that either employ time division multiplexing and are capable of providing only a binary signal (i.e, voltage or current this is off and voltage or current that is on) during the drive cycle or these column drivers may provide a continuous, analog voltage or current signal.

Figure 8:
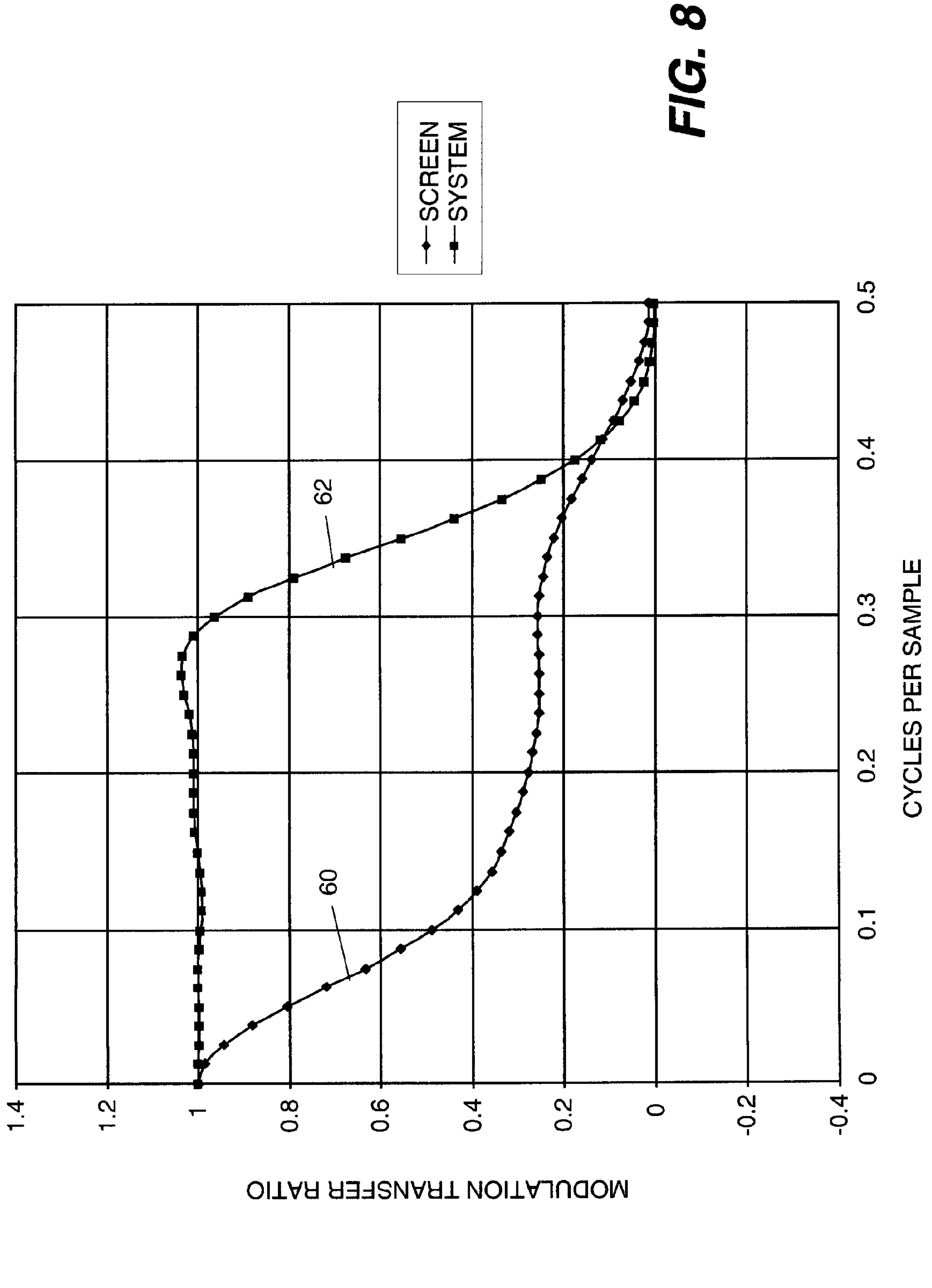
FIG. 8 is a plot depicting the modulation transfer function of another system of the present invention with and without presharpening.

Although the previous discussion provided a method of achieving a 50 percent reduction in peak current, the same general method can be applied to achieve even greater reductions in peak current. One method for reducing the peak current to 33% of the peak current in a traditional one line at a time passive matrix drive method can be achieved by employing the 15 relative row electrode signals shown in Table 2. As before, these relative row electrode signals, generally increase to a peak value and then decline, with the exception of one peak within each tail. When these relative row electrode signals are applied, the native vertical modulation transfer function of the system 60 shown in FIG. 8 is achieved. Once again, the presharpening step 36 can be achieved by applying a vertically oriented digital presharpening kernel having the values 2, 0, −3, 2, 2, −56, 13, 144, 13, −56, 2, 2, −3, 0, 2 and dividing the resulting values by 64. As before, this presharpening kernel compensates for the loss of modulation that occurs at middle and high spatial frequencies when the group of multiple row electrodes are driven simultaneously with the relative drive values shown in Table 2. However, this presharpening kernel applies a slightly higher maximum gain value of 4.09. The resulting system vertical modulation transfer function 62 is shown in FIG. 8 and is significantly closer to ideal than the native modulation transfer function of the system 60.

TABLE 2

| Row Electrode Number | Relative Current Values |
|---|---|
| 1 | 0.0033 |
| 2 | 0.0100 |
| 3 | 0.0167 |
| 4 | 0.0233 |
| 5 | 0.0700 |
| 6 | 0.0533 |
| 7 | 0.1567 |
| 8 | 0.3333 |
| 9 | 0.1567 |
| 10 | 0.0533 |
| 11 | 0.0700 |
| 12 | 0.0233 |
| 13 | 0.0167 |
| 14 | 0.0100 |
| 15 | 0.0033 |

Figure 9:
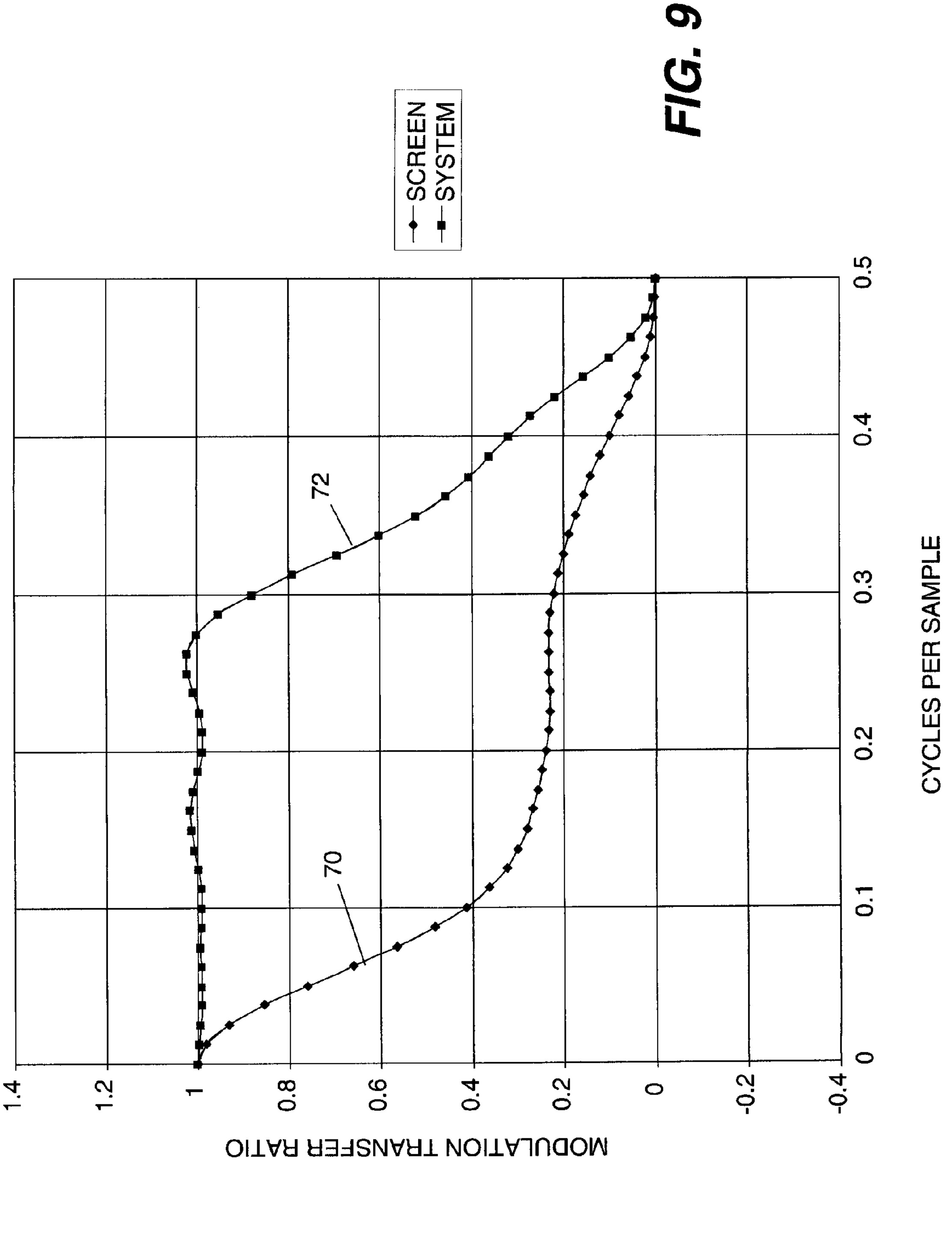
FIG. 9 is a plot depicting the modulation transfer function of another system of the present invention with and without presharpening.

These same methods can be applied to achieve even further reductions in peak current with acceptable image quality loss. For example, the peak current can be reduced to a peak current of 25% of the peak current in a traditional one line at a time passive matrix drive method by employing the 16 relative row electrode signals shown in Table 3. As before, these relative row electrode signals generally increase to a peak value and then decline. Notice that in this instance, the function is monotonic on either side of the center row electrodes. Further notice that two center electrodes, specifically row electrodes 8 and 9, share the peak value. When these relative row electrode signals are applied, the native vertical modulation transfer function 70 of the system shown in FIG. 9 is achieved. Once again, the presharpening step 36 can be achieved by applying a vertically oriented digital presharpening kernel having the values 6, 2, −12, 21, −52, −50, −62, 422, −62, −50, −52, 21, −12, 2, 6 which are divided by a normalization constant of 128 and provide a maximum modulation gain of 4.75. As before, this presharpening kernel compensates for the loss of modulation that occurs at middle and high spatial frequencies when the group of multiple row electrodes are driven simultaneously with the relative drive values shown in Table 3. The resulting vertical system modulation transfer function 72 is shown in FIG. 9 and is significantly closer to ideal than the native modulation transfer function of the system 70.

TABLE 3

| Row Electrode Number | Relative Current Values |
|---|---|
| 1 | 0.0050 |
| 2 | 0.0075 |
| 3 | 0.0175 |
| 4 | 0.0225 |
| 5 | 0.0550 |
| 6 | 0.0675 |
| 7 | 0.0750 |
| 8 | 0.2500 |
| 9 | 0.2500 |
| 10 | 0.0750 |
| 11 | 0.0675 |
| 12 | 0.0550 |
| 13 | 0.0225 |
| 14 | 0.0175 |
| 15 | 0.0075 |
| 16 | 0.0050 |

Figure 10:
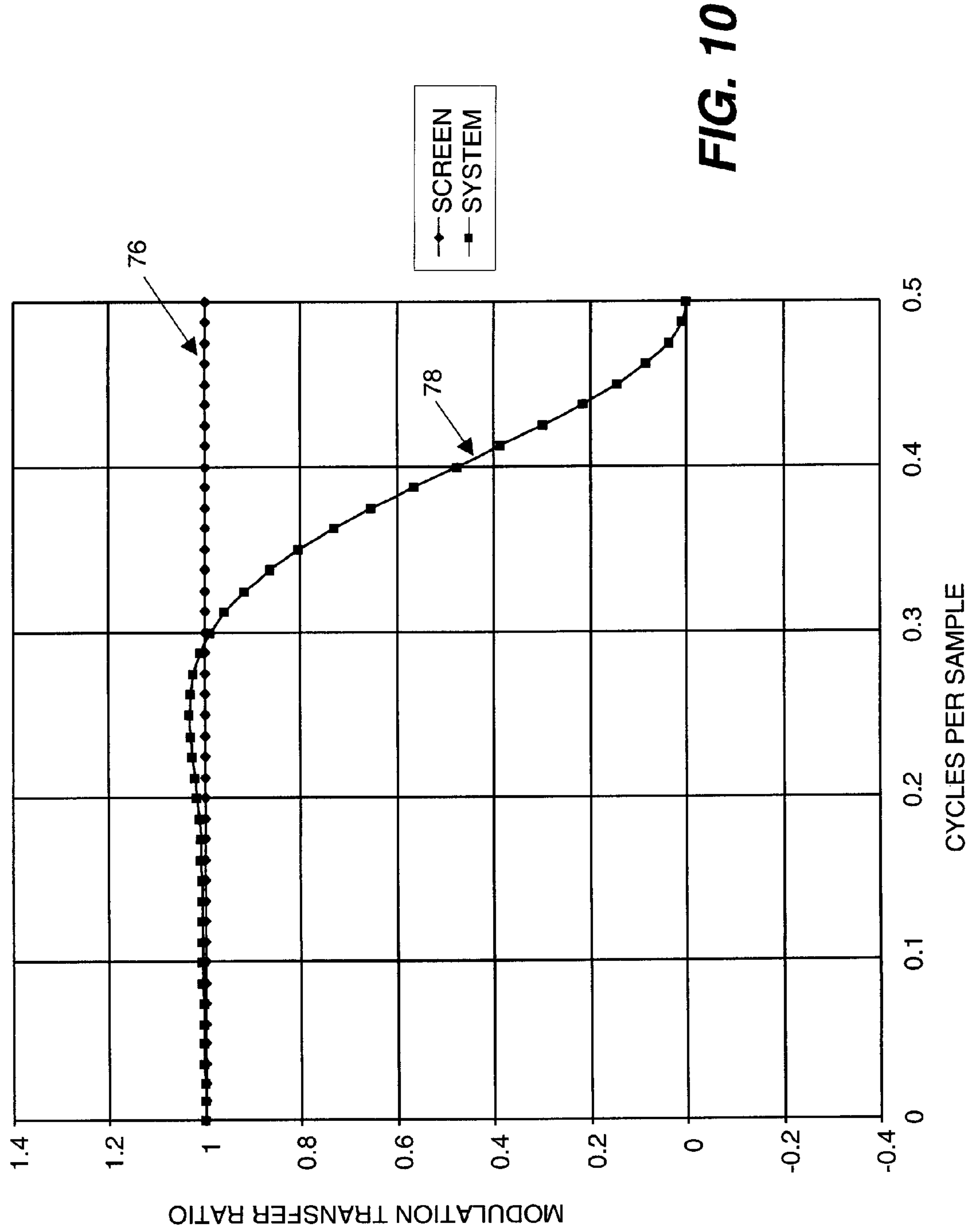
FIG. 10 is a plot showing modulation luminance ratio of a system before and after applying a horizontal blur as is useful in systems of the present invention.

Although the approaches as just described will generally produce images with high image quality, it is possible for these methods to create certain artifacts within the resulting images. One such artifact occurs as a direct result of the blurring that occurs, wherein horizontal edges within the image appear unnaturally sharp. This artifact can be overcome in a number of ways. However, one particularly useful method is to blur the image slightly in the horizontal direction, parallel to the row electrodes. This optional step of blurring the image should be performed prior to applying the presharpen image signal step 34. As shown in FIG. 10, it may be assumed that the horizontal modulation transfer function ratio of the system is unity for all spatial frequencies as indicated by the horizontal line 76. This artifact can be corrected by applying a blur kernel in the horizontal direction to provide a modulation transfer function ratio as indicated by the line 78. This reduces the sharpness of vertical lines somewhat but because the human visual system will adapt to the sharpness level of an image, blurring these lines to match the sharpness of the horizontal lines of the display, results in a more pleasing final image.

Another potential artifact is the clipping of highlight information that occurs as a result of boosting the contrast of certain spatial frequencies using the presharpening kernel. This artifact can be addressed in a number of ways. One method is to perform the presharpening step using an extended bit depth range and to then applying a modified tonescale to bring at least a portion of the clipped information back into the tonal range of the display. This tonescale modification can include applying a simple gain factor by multiplying all values by a given constant but more preferably will apply a more complex function, which allows the contrast of the midscale to be reduced by a smaller margin than the contrast of the highlight information. Another approach is to determine the contrast range of edges within the image and to reduce the contrast of the image prior to presharpening if there are enough edges having a high enough contrast range to present significant clipping artifacts. Yet another approach is to determine the contrast range of edges within the image and to select 34 among different presharpening filters. Different row drive values can also be selected. Groups of different sizes of row electrodes can be used depending on the contrast range or the number of edges in the image. Other approaches include applying a vertical blur function or a contrast reduction to images having high instantaneous contrast in one or more color channels to reduce the amplitude of these transitions prior to presharpening.

Figure 11:
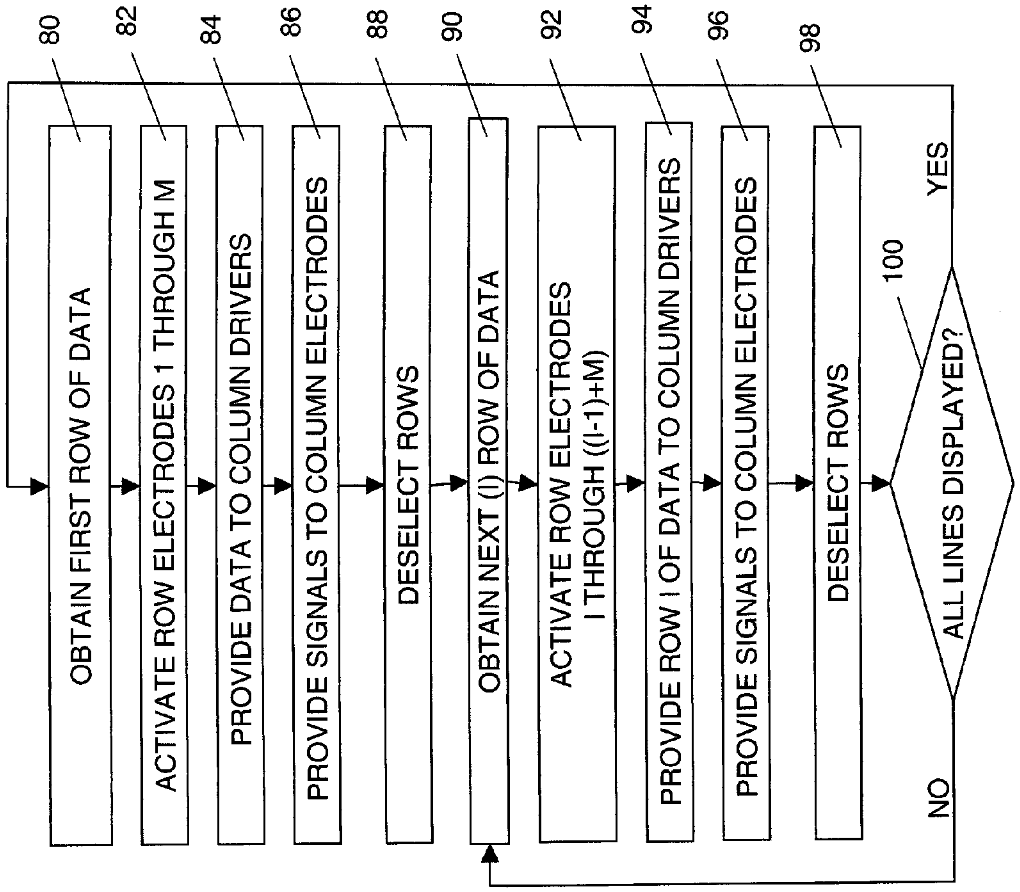
FIG. 11 is a flow diagram depicting a process useful for providing the presharpened image control signal to the row and column drivers of a system of the present invention.

Once the image processing is completed, including the presharpen image signal step 34, the display driver 20 must provide 36 the presharpened image control signal to the column driver 18, which will then provide control signals to the column 6 electrodes. Several methods of providing the control signals 36 can be performed by the data selector 156, which has the opportunity to select different portions of the presharpened image control signal from the output buffer 154. One method to provide the control signals 36 is shown in FIG. 11. To explain this method, we will assume that the input image signal 22 and the resulting presharpened image control signal has 1 through n rows of data where the row of data to be displayed will be indicated by i, where i is a number between 1 and n. We will further designate the selected 32 number of row electrodes as m. As this method is discussed, it will be assumed that the presharpened image control signal will be written into the output buffer 154 after it is presharpened 34 and the method of providing the control signals 36 will operate on data that is stored in this output buffer.

As shown, the display driver 20 will typically obtain a row of the presharpened image control signal from the output buffer 80. The driver will then provide a signal to the row drivers. This signal will activate row electrodes 1 through m 82 wherein the row drivers provide at least two different drive levels to the group of m row electrodes and wherein the at least two drive levels are distributed to have a peak near their center and to have lower, nonzero values on either side of the peak. The first row of the presharpened image control signal is used to provide drive signals to the column drivers 84, which will provide appropriate signals to the column electrodes 86. For example, the column drivers may modulate the time a voltage is provided on the column electrodes which allows current to flow through the light emitting elements 12 in response. As such, this voltage signal will allow current to flow through the column electrodes 6 to the light-emitting elements 12 and to row electrodes 10 1 through m. Therefore, as the first line of data is displayed, the same row and column signals will be provided to rows 1 through m during a first time interval, which we will refer to as $t_1$. The rows can then be deselected 88 by removing the drive value from at least row electrode 1. Within a subsequent time interval $t_i$ the next row of the presharpened image control signal will be obtained 90. The next group of m row electrodes, specifically row electrodes 2 through ((i−1)+m) will be activated 92. Again, the presharpened image control signal will be used to provide column drive signals to the column drivers 94, which will provide signals to the column electrodes 96. Once again, the row electrodes will be deselected 98. This process will be repeated for each time interval $t_i$ during which row i of the data matrix will be displayed onto rows i through ((i−1)+m). A decision 100 will be made as to whether the entire presharpened image control signal has been displayed. If not, the next row of the presharpened image control signal will be obtained 90. Once the entire presharpened image control signal has been displayed, the process will repeat. By following the procedure shown in FIG. 11, each of the n rows of information in the presharpened image control signal are displayed such that they overlap each other by (m−1) rows and each of the rows are activated a total of m times.

It should be further noticed that the instantaneous peak luminance of any light-emitting element 12 is reduced and that each line emits light for m times as long as it would in a passive matrix display in which only one line is addressed at a time. In traditional passive matrix displays, it is necessary to refresh the display at a frequency of at least 72 Hz to avoid the visibility of flicker. However, the frequency required to avoid flicker varies as a function of the instantaneous luminance, the contrast of instantaneous luminance with luminance emitted during the off state, the duration of light emission, and the spatial distribution of the light emission. Because the instantaneous luminance will be reduced, the contrast will be reduced, and the duration of light emission will be increased. Therefore lower refresh rates can be employed without perceptible flicker. Reducing the refresh rate to even 60 Hz will reduce the number of on and off cycles during which the capacitance of EL displays, and especially OLED displays, must be charged, this can reduce this component of power consumption to a ratio of ⅚ths its original value.

Other methods for providing 38 presharpened image control signal can be employed to reduce the refresh rate further. For example, the rows of the presharpened image control signal can be presented in a different order. One such method can involve providing less overlap between subsequently displayed groups of row electrodes 24, 26 and changing the order of displaying the lines of the presharpened image control signal. That is, rather than overlap the second group of row electrodes by all but one row electrode, the groups of row electrodes can be overlapped by half the width of the group of row electrodes on any two subsequent row activation steps. For instance, if one were to apply a set of 9 relative row strength signals; including 1, 2, 4, 8, 15, 8, 4, 2, 1 such that the first row electrode during a second time interval overlapped third or fourth row electrode from the previous time interval, and this pattern was repeated, a relatively uniform luminance pattern would be created within a single scan of the display. Subsequently, the display could be scanned again, employing the same overlap but having the center of the groups displaced by a row. This could be repeated until all of the rows were scanned, completing the image.

Figure 12:
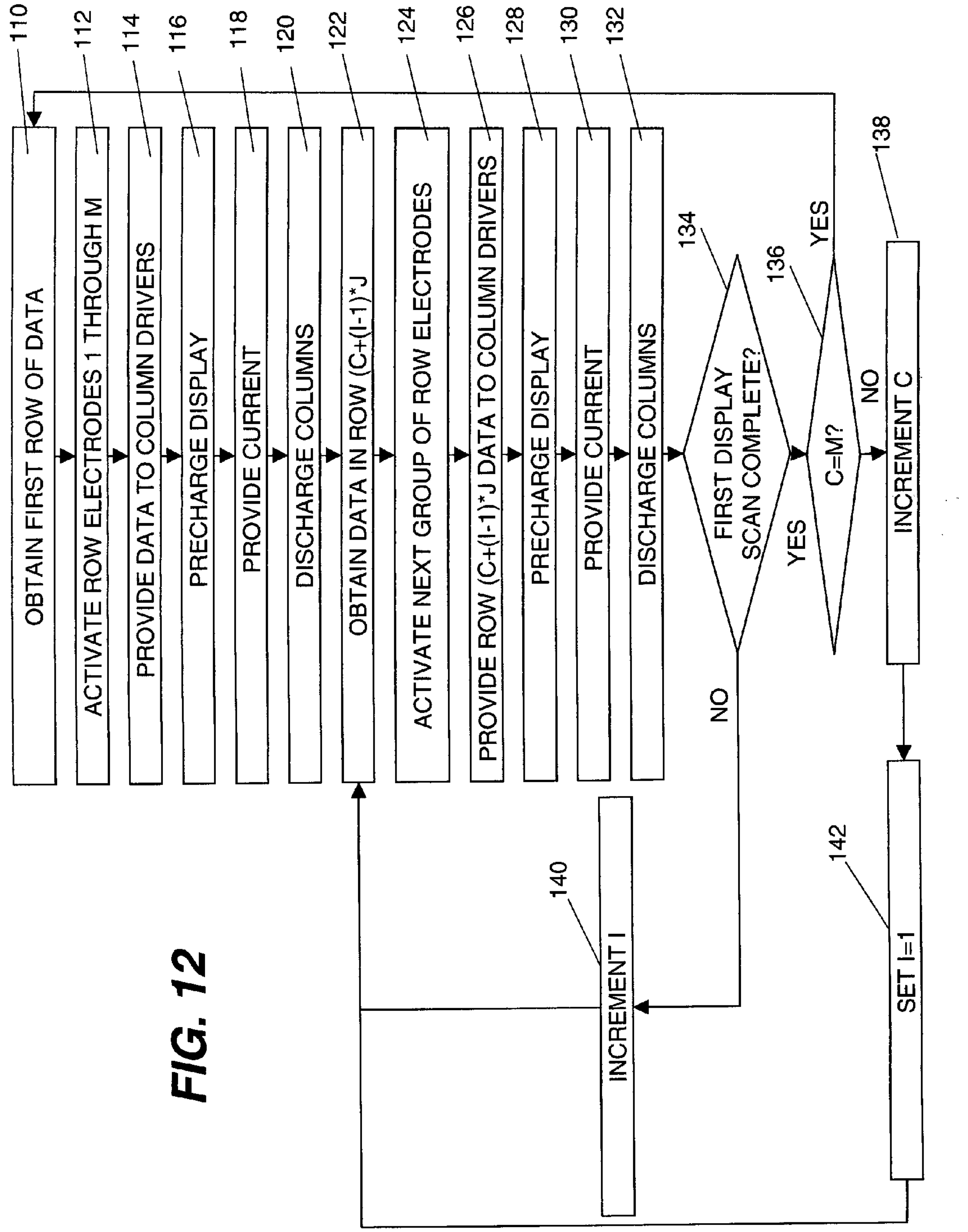
FIG. 12 is a flow diagram depicting an alternate process useful for providing the presharpened image control signal to the row and column drivers of a system of the present invention.

Such a method is depicted in FIG. 12. As before, we will assume that the signal has 1 through n rows of data where i will indicate the row of data to be displayed. However, in this approach i is a number between 1 and n/j, where j is the number of offset row electrodes between two subsequently drawn groups, minus 1. The selected 34 number of row electrodes per group of row electrodes will again be provided as m and we will further designate another variable c, which will increment from 1 to j. As in the previous method, the first row of presharpened image control signal is obtained 110. A signal is provided to the row drivers to activate 112 row electrodes 1 through m. The presharpened image control signal is then used to provide 114 a signal to the column drivers. In a display having significant capacitance, such as in the typical OLED display, the column drivers then precharge 116 the capacitance of the display. Current is then provided 118 by the column drivers to the column electrodes to create current flow through the light-emitting elements, lighting the pixels of the display. Once the necessary luminance has been created, the columns can then be discharged 120. The primary departure between the method shown in FIG. 12 from the method shown in FIG. 11, occurs as the next row of the presharpened image control signal is obtained and displayed. In the method shown in FIG. 12, during the next time interval t, the presharpened image control signal in row (c+(i−1)*j) will be obtained 122. The row electrodes (c+(i−1)−((m−1)/2)) through (c+i*(j−1)+((m−1)/2))) will then be activated 124. Note this group of row electrodes overlaps the previous group of row electrodes by j and the image data that is presented is now (j−1) rows below the previous row in the data matrix. Therefore, rows of the presharpened image control signal have been skipped and can be presented in subsequent scans of the display. The presharpened image control signal values in row (c+(i−1)*j) are then used to provide 126 a signal to the column drivers. Once again, the column drivers precharge 128 the display, provide 130 current to light the pixels of the display and discharge 132 the columns of the display. A decision 134 is made as to whether the first scan of is complete, that is i has reach its maximum value, i is incremented 140, and the next row of data is obtained 122. Once i reaches its maximum value and it is decided 134, that the first display scan is complete a decision 136 will be made as to whether c has obtained it maximum value. If c has not obtained its maximum value, c will be incremented 138 by a value of 1, i will be set to 1 142, and the next row of data will be obtained 136. If it is decided that c has reach its maximum value, the process will begin again by obtaining the first row of data 110.

By following the procedure of FIG. 12, many of the same benefits are achieved as in the previous method. However, the difference is in the spatial luminance pattern that is drawn on the screen. Most notably, j low spatial resolution images are displayed, one after another, that when added together by the human eye results in an image with perceptibly higher spatial frequency information. Because of this spatial pattern, the refresh rate of the display can be reduced significantly. For example, when j=2, the refresh rate can readily be reduced to 36 Hz as some information will still be written to each pixel on the display at a frequency of 72 Hz (e.g., 36 Hz per scan, each image refresh consisting of 2 scans). Further, when j=3, the refresh rate can be reduced further to 24 Hz. It should be noted that often displays of this type are capable of receiving new image updates at a rate of 24 Hz. As such a display using this approach with j=3 can allow the incoming images to be processed and displayed at the same rate. As discussed before, the reduction of this refresh rate is significant as it further reduces the number of cycles that the capacitance of the display must be charged and can therefore, significantly reduce the power consumption of the display. In fact, this capacitive power dissipation can also be reduced by a factor of 1/j.

It should be noted that in most displays, other image processing must also be performed. For example, in displays employing arrays of RGBW light-emitting elements as described in U.S. patent application Ser. No. 10/320,195, it will be necessary to receive a RGB input image signal, linearize the RGB input image signal with respect to aim display luminance, convert the linearized RGB input image signal into a linearized RGBW input signal. Generally, the method provided in FIG. 3 will be employed after such image processing has been performed. The method in FIG. 3, can be performed on linearized data but can be performed, and often will preferably be performed on nonlinear data in which changes in small code values correspond to smaller changes in luminance than changes in large code values.

The display system of the present invention includes an EL display. This display can be any electro-luminescent display that can be used to form a two dimensional array of addressable elements between a pair of electrodes. These devices can include electro-luminescent layers 8 employing purely organic small molecule or polymeric materials, typically including organic hole transport, organic light-emitting and organic electron transport layers as described in the prior art, including U.S. Pat. No. 4,769,292, issued Sep. 6, 1988 to Tang et al., and U.S. Pat. No. 5,061,569, issued Oct. 29, 1991 to VanSlyke et al. The electro-luminescent layer 8 can alternately be formed from a combination of organic and inorganic materials, typically including organic hole transport and electron transport layers in combination with inorganic light-emitting layers, such as the light-emitting layers described in U.S. Pat. No. 6,861,155 issued Mar. 1, 2005 to Bawendi et al. Alternately, the electro-luminescent layer 8 can be formed from fully inorganic materials such as the devices described in co-pending U.S. Ser. No. 11/226,622 filed Sep. 14, 2005, entitled "Quantum Dot Light Emitting Layer".

The display can further employ row and column electrodes, which are formed from an array of materials. The row electrodes, which typically, carry current to more light-emitting elements that are lit simultaneously, than the column electrodes will typically be formed of a metal. Commonly known and applied metal electrodes include electrodes formed from silver and aluminum. When the electrode functions as a cathode, these metals may be alloyed with low work function metals or used in combination with low work function electron injection layers. At least one of the row or column electrodes must be formed of materials that are at transparent or semi-transparent. Appropriate electrodes include metal oxides such as ITO and IZO or very thin metals, such as thin layers of silver. To decrease the resistivity of these electrodes, additional opaque bus bars can be formed in electrical contact with these electrodes.

The substrate can also be formed of almost any material. When the transparent or semi-transparent electrode is formed directly on the substrate, it is desirable for the substrate to be formed from a transparent material, such as glass or clear plastic. Otherwise, the substrate can be either transparent or opaque. Although not shown, such displays generally will include additional layers for mechanical, oxygen, and moisture protection. Methods of providing this type of protection are well known in the art. Also not shown within the diagrams of this disclosure, are mechanical structures, such as pillars that are commonly employed during manufacturing of passive matrix OLED displays that enable the patterning of the electrode furthest from the substrate.

Although, the current invention has been discussed specifically for EL displays, the method of the present invention can be usefully employed with alternate display technologies. Particularly any display technology requiring the flow of current, as is typical in most emissive display technologies, including field emission or surface-conduction-electron-emitter displays, can benefit from aspects of the present invention. This invention will be of even greater benefit in display technologies that not only require the flow of current and have cells that are thin enough to provide capacitive losses when cycling individual light-emitting elements from on to off.

The invention has been described in detail with particular reference to certain preferred embodiments thereof, but it will be understood that variations and modifications can be effected within the spirit and scope of the invention.

PARTS LIST

| | |
|---|---|
| 2 | display |
| 4 | substrate |
| 6 | column electrode |
| 8 | electro-luminescent layer |
| 10 | row electrode |
| 12 | EL light-emitting element |
| 16 | row driver |
| 18 | column driver |
| 20 | display driver |
| 22 | input image signal |
| 24 | group of row electrodes |
| 26 | group of row electrodes |
| 28 | row electrode near center of a group of row electrodes |
| 30 | receiving input image signal step |
| 32 | optional selecting number of row electrodes step |
| 34 | presharpening step |
| 36 | providing presharpened image control signal step |
| 38 | providing signal step |
| 40 | vertical modulation transfer function |
| 42 | modulation axis |
| 44 | frequency axis |
| 46 | final vertical modulation transfer function |
| 48 | spatial frequency response of presharpening kernel |
| 50 | luminance stability function |
| 54 | drive voltage function |
| 60 | native vertical modulation transfer function |
| 62 | resulting vertical modulation transfer function |
| 70 | native vertical modulation transfer function |
| 72 | resulting vertical modulation transfer function |
| 76 | horizontal line |
| 78 | horizontal modulation transfer function ratio |
| 80 | obtain row of presharpened image control signal from output buffer step |
| 82 | activate group of row electrodes step |
| 84 | provide column driver signals step |
| 86 | provide column electrode signals step |
| 88 | deselect rows step |
| 90 | obtain next row of presharpened image control signal step |
| 92 | activate next group of row electrodes step |

-continued

PARTS LIST

| | |
|---|---|
| 94 | provide next column driver signals step |
| 96 | provide next column electrode signals step |
| 98 | deselect row electrodes step |
| 100 | decision step |
| 110 | obtain row of presharpened image control signal step |
| 112 | activate group of row electrodes step |
| 114 | provide signal to column driver step |
| 116 | precharge capacitance step |
| 118 | provide current step |
| 120 | discharge step |
| 122 | obtain selected row of presharpened image control signal step |
| 124 | activate next group of row electrodes step |
| 126 | provide signal to column driver step |
| 128 | precharge step |
| 130 | provide current step |
| 132 | discharge step |
| 134 | decide first scan complete step |
| 136 | decide all scans complete step |
| 138 | increment c step |
| 140 | increment i step |
| 142 | set i step |
| 150 | input buffer |
| 152 | sharpening unit |
| 154 | output buffer |
| 156 | data selector |
| 158 | timing generator |

The invention claimed is:

1. A passive matrix, electro-luminescent display system for receiving an input image, processing such input image, and displaying such processed image, comprising:

a. a passive matrix, electro-luminescent display having an array of column electrodes, an array of row electrodes orientated orthogonally to the array of column electrodes and an electro-luminescent layer located between the array of column electrodes and the array of row electrodes, the intersection of each column and row electrode forming an individual light-emitting element;

b. one or more row drivers for providing separate signals at different times to different groups of row electrodes within the array of row electrodes wherein each group of row electrodes contains at least 5 row electrodes, wherein the row electrodes of each group simultaneously receive signal levels that are distributed such that a row electrode(s) at or near the center of the group receives a higher peak signal level and other row electrodes in the group receive lower, nonzero signal levels such that as the distance from the row electrodes(s) at or near the center increases, the signal to the other row electrodes in the group decreases, then increases to a secondary maximum and then decreases again;

c. a display driver for receiving the input image signal and processing this input image signal to provide a presharpened image control signal; and d. one or more column drivers responsive to the presharpened image control signal for simultaneously providing a signal to the multiple column electrodes within the array of column electrodes at the same time signals are provided to the groups of row electrodes so that the concurrence of row and column signals causes individual light-emitting element to produce light.

2. The passive matrix, electro-luminescent display system of claim 1, wherein the display driver additionally blurs the input image signal in a direction parallel to the row electrodes.

3. The passive matrix, electro-luminescent display system of claim 1, wherein a second group of row electrodes overlaps a first group of row electrodes.

4. The passive matrix, electro-luminescent display system of claim 3, wherein the second group of row electrodes overlaps the first group of row electrodes such that the sum of the distribution of row electrode signal levels in the first group and the distribution of row electrode signal levels in second group form a distribution that is substantially flat in the center.

5. The passive matrix, electro-luminescent display system of claim 1, wherein the displayed image is refreshed at a rate less than 60 Hz.

6. The passive matrix, electro-luminescent display system of claim 1, wherein the control signal provided to the row electrodes is a discrete multilevel signal and the control signal provided to the column electrodes is pulse width modulated.

7. A display driver to receive an input image signal and processing the input image signal to provide a presharpened image control signal, comprising:

an input buffer to store a portion of the input image signal;

a sharpening unit to sharpen the input image signal;

an output buffer to store the presharpened image control signal;

a data selector to provide the presharpened image control signal from the output buffer to the one or more column drivers; and a timing generator to provide a control signal to the one or more row drivers to ensure that signals are provided to the one or more row drivers and the one or more column drivers at the same time, wherein the one or more row drivers provide separate signals at different times to different groups of row electrodes within an array of row electrodes, wherein each group of row electrodes contains at least 5 row electrodes, and wherein the row electrodes of each group simultaneously receive signal levels that are distributed such that a row electrode(s) at or near the center of the group receives a higher peak signal level and other row electrodes in the group receive lower, nonzero signal levels such that as the distance from the row electrodes(s) at or near the center increases, the signal to the other row electrodes in the group decreases, then increases to a secondary maximum and then decreases again.

* * * * *